No. 805,243.　　　　　　　　　　　　　　PATENTED NOV. 21, 1905.
R. STONE.
SPRING TIRE FOR WHEELS.
APPLICATION FILED FEB. 18, 1905.

Witnesses
J. Bernard Hayward.
J. Venon Fellows.

Inventor
Richard Stone
per Charles J. Powell
Attorney

UNITED STATES PATENT OFFICE.

RICHARD STONE, OF WELLINGTON, ENGLAND.

SPRING-TIRE FOR WHEELS.

No. 805,243.

Specification of Letters Patent.

Patented Nov. 21, 1905.

Application filed February 18, 1905. Serial No. 246,269.

*To all whom it may concern:*

Be it known that I, RICHARD STONE, a subject of the King of Great Britain, residing at "Ferndale," Wellington, in the county of Salop, England, have invented certain new and useful Improvements in Spring-Tires for Wheels, of which the following is a specification.

This invention relates to improvements in or relating to spring-tires for wheels, and more especially to tires of the class adapted for use on the wheels of self-propelled vehicles, such as motors, motor-omnibuses, wagons, or the like; and its object is to provide an improved combination and arrangement of parts by which a desirable resiliency is obtained with a minimum of cost, wear, and tear and with a hitherto-unattained simplicity of construction and by which it is comparatively easy to put the parts together in a short time, so that should the spring-band be broken a new one may be easily and quickly put in with little delay.

Essentially this invention comprises, in combination with the main body of the wheel and a suitable tread, an endless inextensible and equally all-around flexible steel band, two side-supporting flange-plates carried from the body of the wheel, and a buffer (rubber preferred) on each side between these two. These buffers are constructed so as to form projections from the tread.

I attain the aforesaid objects by means of the mechanism illustrated in the accompanying drawings, in which—

Figure 1:
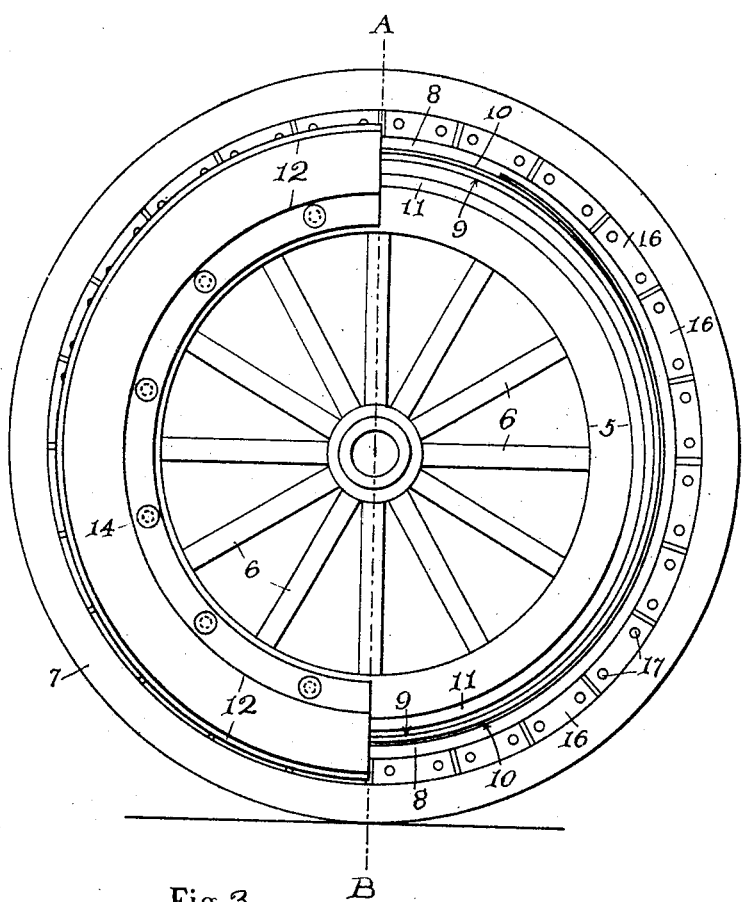
Figure 2:
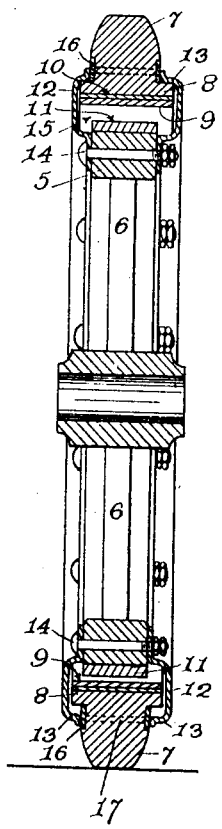
Figures 3, 4:
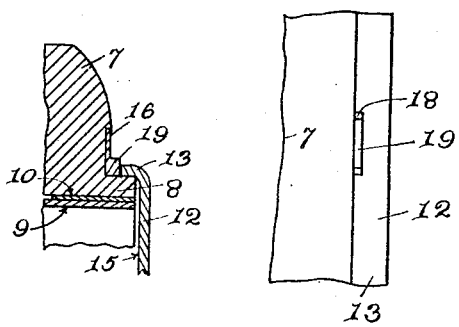

Figure 1 is a part-sectional side view of a wheel constructed according to this my invention. Fig. 2 is a sectional view on line A B of the top and bottom of the said wheel, the central portion forming no part of this my invention. Fig. 3 is a part-sectional view, and Fig. 4 a part plan view, of a portion of my invention, showing means which may be used, if required, for preventing the creeping movement of the tread in relation to the central part of the wheel.

Similar numbers of reference refer throughout the several views to the same thing or part.

5 is the felly of the wheel, and 6 represents the spokes, both of which, together with the center of the wheel, may be made of any suitable material or design, but usually are made of wood, the said central portion of the wheel, however, as before intimated, forming no part of this my invention.

7 is the tread of the tire, which may be of any suitable material; but for most cases probably india-rubber is preferred. This tread is furnished with an outstanding buffer-flange 8 on each side, which is also preferably of rubber, but may be of other suitable material which is sufficiently flexible and capable of absorbing vibrations.

9 is an endless spring-band or combination of spring-bands, usually of steel, which fits tightly upon the interior of the tread 7. It is thought that a slight movement may take place between the inner surface of the tread and the outer surface of the band 9 when the said band is used without a lining 10, and it might, therefore, be an advantage to have the metal lining 10 between these two bodies, so that such a movement may take place between the two metallic surfaces. At the same time the said lining is not absolutely necessary.

The inner diameter of the band 9 is greater than the exterior diameter of the felly, and this should be to such an extent that in ordinary use the two will not touch each other at any time. In some cases I may provide an exterior cover 11 upon the felly, of felt, rubber, or other suitable material, which may serve as a cushion to receive contact with the interior of the band 9 should such a contact unavoidably take place under exceptional circumstances—such, for instance, as passing over a very uneven surface.

12 12 are side flanged plates having the overhanging flanges 13 13, the said plates, when their size admits of convenient manufacture, being preferably made each in one piece. These plates are bolted to the felly by the bolts 14, any required number of which may be used. On the interior side of these plates a gap 15 is made of sufficient dimensions to allow of free movement of the flanges 8 and the band 9.

Where excessive side wear is experienced, I may provide side plates 16, which may be secured in small segments to the sides of the tread in any convenient manner—such, for instance, as by rivets or the like, as shown at 17.

In some cases there may be a tendency for a slight variation of movement to take place between the tread and the central part of the wheel—that is to say, between the tread and the plates 12—and in order to prevent this I may form in the side plates 12 any desirable number of notches or gaps 18 and also form upon the segmental plates 16 corresponding projections 19, which shall engage with such gaps, so that the two must necessarily travel together. Other equivalents to the gaps 18 and the projections 19 may be used, such as by forming them upon the circumference of the flanges 8 and the corresponding interior surfaces of the flanges 13; but the method illustrated appears to meet requirements.

The action of this arrangement appears to be as follows—that is to say, when the tread of the wheel comes into contact with inequalities on the road and pressure is applied at the uppermost part of the circumference of the buffer-flanges 8 it is thence transmitted through the said buffers to the spring-band, by which the said buffers and the spring are slightly flattened, and as the wheel rotates this point of pressure with its slightly-flattened result is constantly changed around the remainder of the circumference. It also follows as an important point that, by reason of the flexibility of the band 9 being equal throughout, its constantly-changing position from the true circular form does not tend to break it, which possibility of breakage is also lessened by the fact that the vibratory shocks caused in travel are transmitted through the buffers aforesaid.

What I claim as my invention, and desire to secure by Letters Patent, is—

1. In spring-tires for wheels, the combination with a tread provided at its bottom with an annular buffer-flange, plates secured on the sides of said tread and having lateral projections, side flange-plates bolted to the felly and having overhanging flanges adapted to engage over said buffer-flanges and provided with recesses for receiving said projections, and an endless flexible spring-band surrounding the felly at a distance therefrom and normally engaging the under side of said tread.

2. In spring-tires for wheels, the combination with a tread having annular buffer-flanges, of side flange-plates bolted to the felly and engaging over said buffer-flanges, an endless flexible spring-band encircling the felly at a distance therefrom and normally engaging the under side of said tread, and a cushion encircling said felly at a distance from said spring-band.

In testimony whereof I have hereunto set my hand in presence of two subscribing witnesses.

RICHARD STONE.

Witnesses:
J. BERNARD HAYWARD,
T. V. FELLOWS.